US006632310B2

(12) United States Patent
Freeman et al.

(10) Patent No.: US 6,632,310 B2
(45) Date of Patent: Oct. 14, 2003

(54) DISK DRIVE ACTUATOR AND METHOD OF MAKING SAME

(75) Inventors: Robert David Freeman, Erie, CO (US); Thomas Edward Berg, Fort Collins, CO (US); David William Niss, Boulder, CO (US); Peter Jeffrey Raymond, Erie, CO (US)

(73) Assignee: DPHI Acquisitions, Inc., Boulder, CO (US)

( * ) Notice: Subject to any disclaimer, the term of this patent is extended or adjusted under 35 U.S.C. 154(b) by 84 days.

(21) Appl. No.: 09/815,293

(22) Filed: Mar. 21, 2001

(65) Prior Publication Data

US 2002/0134492 A1 Sep. 26, 2002

(51) Int. Cl.$^7$ .............................. G11B 5/48; G11B 5/54
(52) U.S. Cl. .................... 156/182; 156/60; 360/244.2; 360/244.5; 360/245.2
(58) Field of Search ................ 156/182, 60; 360/244.6, 360/106, 104, 244.7, 245.2, 244.2, 244.3, 244.4, 244.5, 244.8, 244.9, 245

(56) References Cited

U.S. PATENT DOCUMENTS

| | | | | |
|---|---|---|---|---|
| 4,552,604 A | * | 11/1985 | Green | 156/246 |
| 4,824,498 A | * | 4/1989 | Goodwin et al. | 156/344 |
| 4,970,135 A | * | 11/1990 | Kushi et al. | 430/280.1 |
| 5,491,597 A | * | 2/1996 | Bennin et al. | 360/234.5 |
| 5,834,084 A | * | 11/1998 | Maggio | 29/825 |
| 5,844,751 A | | 12/1998 | Bennin et al. | |
| 5,978,178 A | | 11/1999 | Adley | |
| 6,007,664 A | * | 12/1999 | Kuizenga et al. | 156/272.8 |
| 6,055,133 A | | 4/2000 | Albrecht et al. | |
| 6,091,578 A | * | 7/2000 | Stole et al. | 360/265.9 |
| 6,151,198 A | * | 11/2000 | Prater et al. | 148/549 |
| 6,250,364 B1 | * | 6/2001 | Chung et al. | 164/113 |
| 2002/0006014 A1 | * | 1/2002 | Heist et al. | 360/244.6 |
| 2002/0063997 A1 | * | 5/2002 | Takagi et al. | 360/244.6 |

FOREIGN PATENT DOCUMENTS

JP 2000-57723 2/2000

OTHER PUBLICATIONS

IBM Corp: "Carbon Fiber Reinforced Metal Matrix or Polymer Composite E–block", Research Disclosure, vol. 42, No. 425, Sep. 1999.
IBM Corp: "Stacked Actuator, High Stiffness, Adhesively Bonded", XP–002207351.
Patent Abstracts of Japan, vol. 2000, No. 05, Sep. 14, 2000.

* cited by examiner

*Primary Examiner*—Richard Crispino
*Assistant Examiner*—Sue A. Purvis
(74) *Attorney, Agent, or Firm*—MacPherson Kwok Chen & Heid LLP

(57) ABSTRACT

The present invention relates to a laminated actuator assembly and the method for making the actuator assembly. The actuator assembly is intended for use in miniature personal electronic devices, but could be used in any type of disk drive. The actuator is primarily constructed from strong, stiff, lightweight composite materials. The upper and lower planar elements of the actuator assembly, each comprising multiple composite layers, include a forward portion and a rearward portion. A flexure member, typically positioned between the layers of composite material, allows the forward portion of each planar element to pivot in unison relative to the rear portion of each planar element. In this manner, the position of an optical pick up unit or other read/write device positioned at the distal end of the actuator assembly can be adjusted relative to the surface of a data disk. The composite and flexure planar elements are formed in arrays of multiple component pieces with aligned registration members. The registration members provide accurate alignment during assembly. Adhesive is applied in appropriate quantities to fully fill the space between the upper and lower layers, without seepage at the edges. By assembling the actuator components in arrays, the miniature actuator assemblies can be easily handled and the electronic, optic and magnetic subassemblies can be attached more easily.

13 Claims, 17 Drawing Sheets

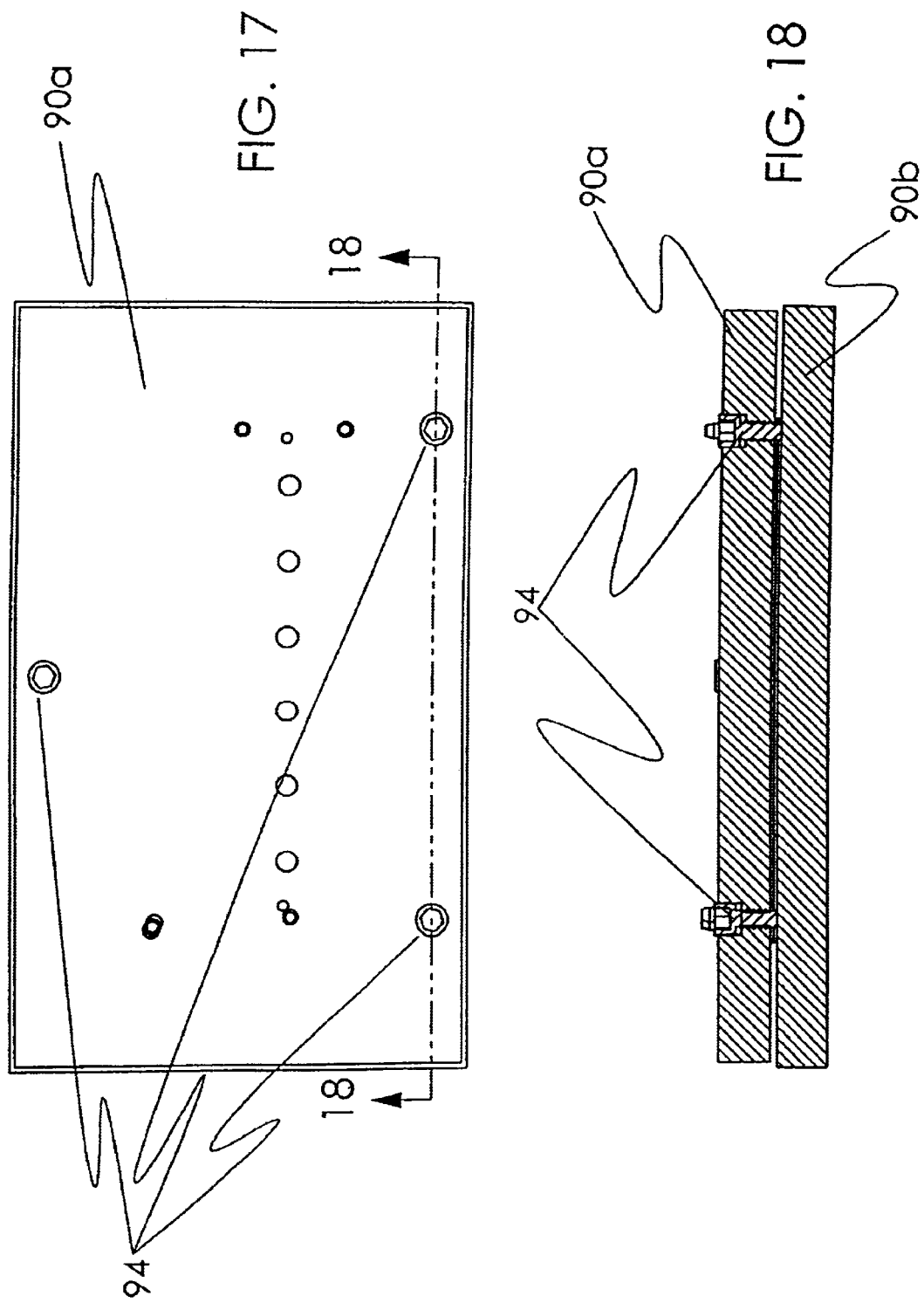

DISK DRIVE ACTUATOR AND METHOD OF MAKING SAME

CROSS-REFERENCE TO RELATED APPLICATIONS

The present application is related to U.S. patent application Ser. No. 09/557,284, filed Apr. 24, 2000, entitled "Tilt Focus Method and Mechanism for an Optical Drive," which is incorporated herein by reference in its entirety.

FIELD OF THE INVENTION

The present invention relates to disk drives and, more particularly, to laminated actuator assemblies made from composite materials and the method for making such actuator assemblies.

BACKGROUND OF THE INVENTION

Disk drives typically write data to or read data from some type of circular media, such as a magnetic or optical disk. The disk is usually arranged in concentric circles or tracks on the disk. As the disk rotates about a shaft, data is read from or written to the disk by operation of a read/write element or head assembly. An actuator assembly, including an actuator arm, positions the read/write element over the various tracks for purposes of reading data from or writing data to designated tracks on the disk.

It is a continuous goal of the disk drive industry to reduce the size and weight of disk drives while simultaneously increasing, or at least maintaining, storage capacity. With reduced size and increased capacity, disk drives can be used in an ever increasing variety of applications. For example, miniature disk drives not only allow for building smaller portable computers, but also provide enhanced functionality to personal electronic devices (PEDs) such as cameras, music players, voice recorders, cam corders, portable music recorders and other similar devices. In this regard, many disk drive components, like actuator assemblies, are being designed as plastic pieces to reduce weight and cost of production compared to metal actuator assemblies. However, plastic actuator assemblies are more susceptible to breakage from shock or extreme temperature variations that come with use in portable instruments. Moreover, plastic actuator assemblies also are less rigid and therefore susceptible to vibration and bending which can result in positioning errors which may lead to track encroachment. Lack of stiffness or rigidity can also create resonant frequency problems and, as a result, require limitations in the bandwidth of servo systems in which they operate to avoid such problems.

Plastic actuator assemblies are also susceptible to imprecision in molding processes. For example, while filled plastics may have improved properties, they also may have irregularities, such as anisotropic properties, which are difficult to control. Similarly, metal actuators are also susceptible to imprecision in manufacture, whether it be forging, etching or stamping. Such imprecision, even within acceptable tolerances ranges, may create problems in positioning the head assembly relative to the disk. Attaining desired degrees of precision in the manufacture of actuator assemblies is made even more difficult as actuator assemblies become smaller and smaller. Controlling manufacturing tolerances at increasingly smaller sizes in molding, forging, etching or stamping even if attainable, becomes prohibitively expensive.

SUMMARY OF THE INVENTION

One embodiment of the present invention is a laminated actuator assembly comprising three or more planar elements, with most of those planar elements comprising carbon fiber composite material made of several layers. These multi-layer carbon fiber composite planar elements are separated by a central planar element comprising a flexure and spacer. The number of individual layers or plies comprising the planar elements may vary. Fiber orientation among the various carbon fiber layers is selectively and strategically placed through the thickness of the carbon fiber planar element to align with principal axes of the beam elements of the actuator arm in order to optimize particular objectives, such as bending and twisting stiffness.

One of the planar elements also comprises a flexure member. The flexure member allows the forward portion of the actuator assembly to pivot relative to the rear portion of the actuator assembly, allowing an optical pick up unit disposed on the distal end of the actuator assembly to move relative to the surface of an optical disk for purposes of maintaining focus on the information layer of the disk. The flexure member is preferably made from a lightweight, flexible metal having a high yield strength and can be formed from either an etching, stamping or die cutting process. The flexure member may be positioned adjacent the outer surface of a carbon fiber planar element, or it may be positioned between two carbon fiber planar elements. In those instances when the flexure member is disposed between carbon fiber planar elements, a spacer also may be included to maintain appropriate spacing between carbon fiber planar elements directly separated by the flexure. The spacer provides for a more uniform adhesive layer in the completed laminated actuator assembly. The flexure member footprint does not necessarily have to match the footprint of the carbon fiber planar elements. Similarly the footprints of the carbon fiber planar elements may vary. Such variability facilitates attachment of other components, such as the optical pickup unit and flex circuit.

The fibers in the various layers of the planar elements need not be carbon but may be glass or light metals such as boron, magnesium or beryllium, or other materials such as kevlar or ceramic. Alternatively, the fibers in any particular layer may comprise a combination of two or more of these materials. The spacer may be made of the same material as the flexure member, or may be made of a laminate of fiber layers such as carbon or of other lightweight materials, such as magnesium, foam core, plastic or honeycomb. The combination provides a structure which is strong, light weight and resistant to bending, vibration and twisting, and one which is ideal for use in a miniaturized environment.

The fiber laminate planar elements provide the structural characteristics of the actuator assembly. These planar elements, or upper and lower composite planar elements when viewed relative to the surface of the disk, are manufactured in arrays of multiple component pieces. More specifically, a number of layers of fiber material are combined to form a composite planar element panel. A water jet or other appropriate cutting device, under computer control, cuts the composite planar element panel into an array of multiple copies of the upper and lower fiber planar elements, still attached to the exterior frame of the overall lamination panel. For efficiency and handling, the component pieces remain attached to the overall lamination panel in an array format. In addition, registration points are also formed in each panel for subsequent use in aligning the panel to the corresponding arrays of components in mating panels during subsequent processing. The panels of flexure elements include similar registration features for co-alignment with the panels of upper and lower carbon fiber planar elements.

As an alternative, unique or individual cuts may be initially made in the composite planar element panels before lamination and all cuts common to the planar elements made following the lamination of the planar elements. Using appropriate registration features, the individual composite planar element panels are laminated to create the laminated actuator assembly panels. Fabrication in this manner provides the option to have different footprint geometries of the individual planar elements or the overall laminate of the actuator assembly, since the component shape can be unique in each planar element.

The number of planar elements in the laminated actuator assembly could range from one, with the flexure on either the top or bottom surface, to as many as two dozen, with the flexure being located on either surface or between any two interior planar elements. The number of fiber layers in a single composite planar element is determined by the thickness limitations of the planar element, dividing the allowable planar element thickness by the fiber diameter at maximum material condition. Practical embodiments would likely range from one to seven planar elements in an actuator assembly. Each planar element can be optimized for directional stiffness properties via fiber orientation, based upon the final placement within the thickness of the planar element and the laminated actuator assembly.

Lamination is accomplished by aligning and bonding multiple fiber layers to form fiber planar elements, and by aligning and bonding one or more fiber planar elements to the flexure planar element. As previously stated, a spacer element may be positioned in a coplanar relationship with the flexure planar element. The bonding process may be accomplished by oven cure or room temperature cure. Pressure is applied to the stack of planar elements during the cure process, via a clamping fixture that can be set to establish a finished laminate stack thickness. Setting of the stack height effectively defines the bond line thickness dimensions so that bond strength and adhesive squeeze out can be optimized. Adhesive is applied to the fiber planar elements either prior to alignment and installation in the clamping fixture or as the arrays of planar elements are placed in the clamping fixture. Adhesive can be applied using silk screen techniques, with the silk screen also having registration members for accurate alignment with the fiber planar elements. Alternatively, the adhesive may be applied by roller or by spraying or other printing or as a film. The clamping fixture may also include a vacuum chuck to constrain movement and maintain alignment of the planar elements and silk screen pattern. The clamping fixture includes complementary registration features which interact with the registration features in the fiber and flexure planar element panels to accurately position the planar elements relative to each other.

In embodiments that utilize a flexure which does not match the footprint of the mating fiber planar elements, and in which a spacer layer is not utilized, a varying bond line thickness is created. In order to prevent adhesive overflow at the edges of the planar elements, the adhesive cannot be applied in a single, uniformly thick layer. To overcome this problem, the adhesive is applied in a single application of discreet stripes of adhesive, analogous to half tone printing procedures. In the areas where the flexure is present, fewer or less dense stripes of adhesives are applied. As a result, when the planar elements are all aligned and appropriate pressure is applied, the adhesive spreads out and uniformly fills the space between the planar elements that encapsulate the flexure member.

Once arrays of upper and lower fiber planar elements and flexure planar elements have been laminated into an array of actuator arms, the arms may be removed (singulated) from the laminated panel for further assembly operations, or left in the panel and further assembly operations performed in panelized, batch process operations.

BRIEF DESCRIPTION OF THE DRAWINGS

For a more complete understanding of this invention, one should now refer to the embodiment illustrated in greater detail in the accompanying drawings and described below by way of example of the invention. In the drawings:

FIG. 17 is a top view of the bonding fixture.

FIG. 18 is a cross-section view of the bonding fixture taken along line 18—18 of FIG. 17.

While the following disclosure describes the invention in connection with one embodiment, one should understand the invention is not limited to this embodiment. Furthermore, one should understand that the drawings are not necessarily to scale and that graphic symbols, diagrammatic representatives and fragmentary use, in part, may illustrate the embodiment. In certain instances, the disclosure may not include details which are not necessary for an understanding of the present invention such as conventional details of fabrication and assembly.

DETAILED DESCRIPTION OF THE PREFERRED EMBODIMENT

Figure 1:
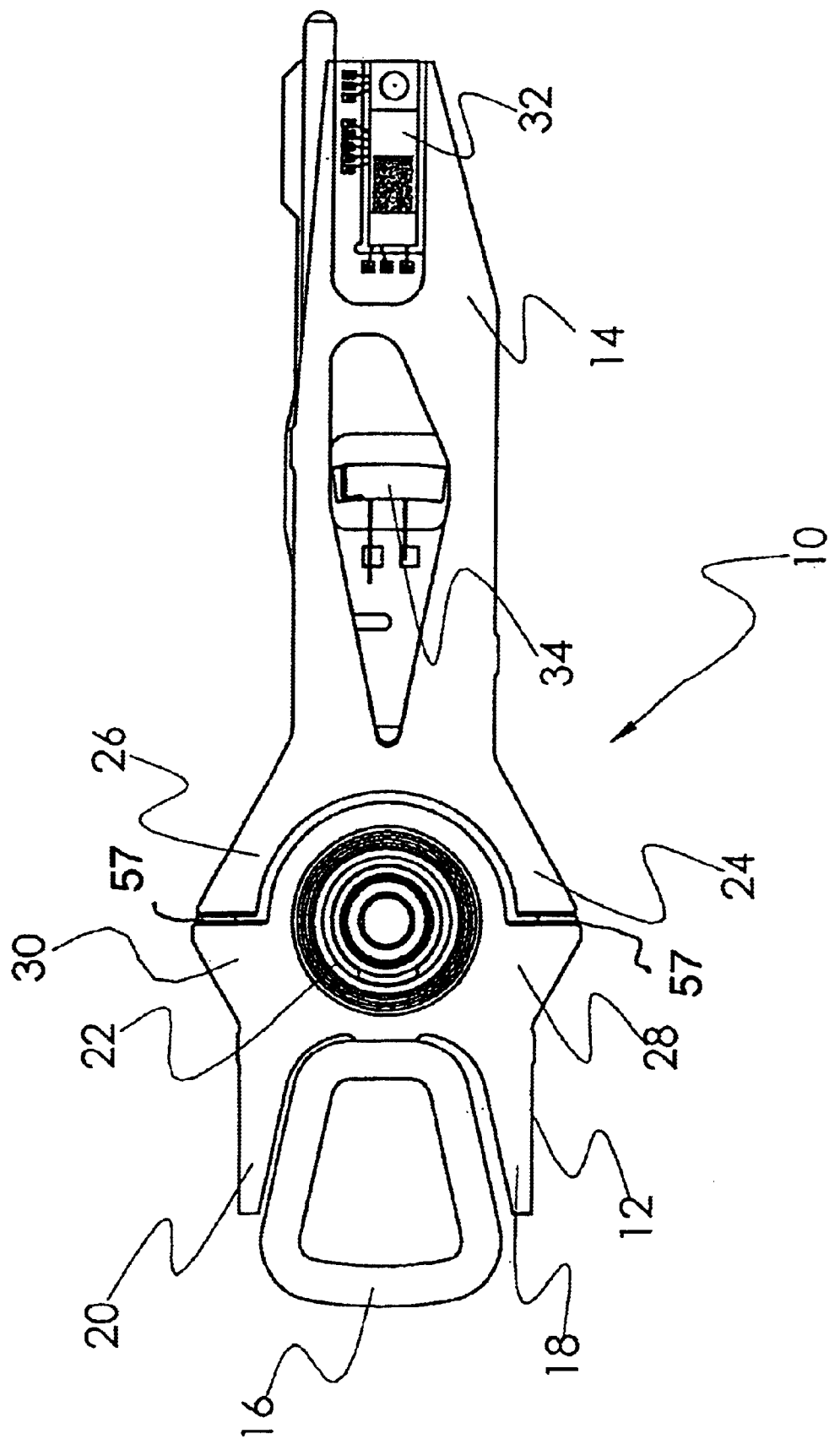
FIG. 1 is a top plan view of an embodiment of the actuator assembly of the present invention.

FIG. 1 shows a first embodiment of the actuator arm 10 of the present invention. As generally shown, the actuator arm includes a rear portion 12 and a front portion 14. The front portion 14 is also referred to as a focus arm. A voice coil 16 is positioned between two extensions or legs 18, 20 formed in the rear portion and cooperate with permanent magnets, not shown, to form a voice coil motor (VCM) to position the actuator arm 10 relative to the surface of a disk. A bearing cartridge 22 is disposed within a circular bore formed between legs 24, 26 of the front portion 14 and legs 28, 30 of the rear portion 12. An optical pickup unit 32 for reading information from or writing information to an optical disk is disposed at the distal end of the focus arm 14. A second voice coil motor 34 acts to move the focus arm 14 of the actuator 10 in a direction generally perpendicular to the surface of the disk in order to maintain the optical pickup unit in focus with the information layer contained on the disk. The actuator arm 10 is discussed in greater detail in pending U.S. application Ser. No. 09/557,284, which is incorporated herein by reference. Although the actuator arm is described in the context of an optical disk drive, it should be understood that it applies equally to other applications, including but not limited to magnetic hard disk drives.

Figure 2:
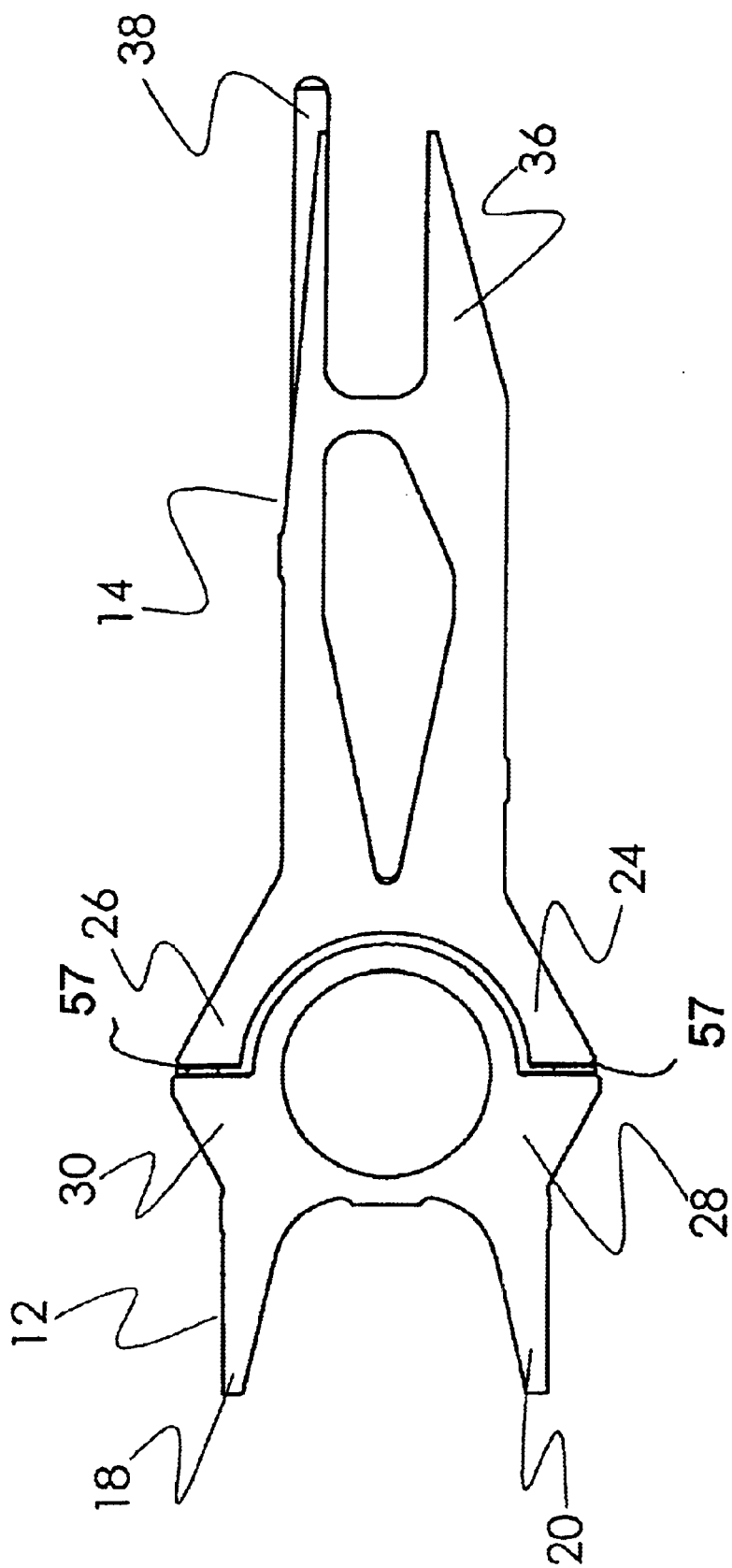
FIG. 2 is a top plan view of an embodiment of the actuator assembly of the present invention, with the optical, magnetic and electrical components removed.
Figure 3:
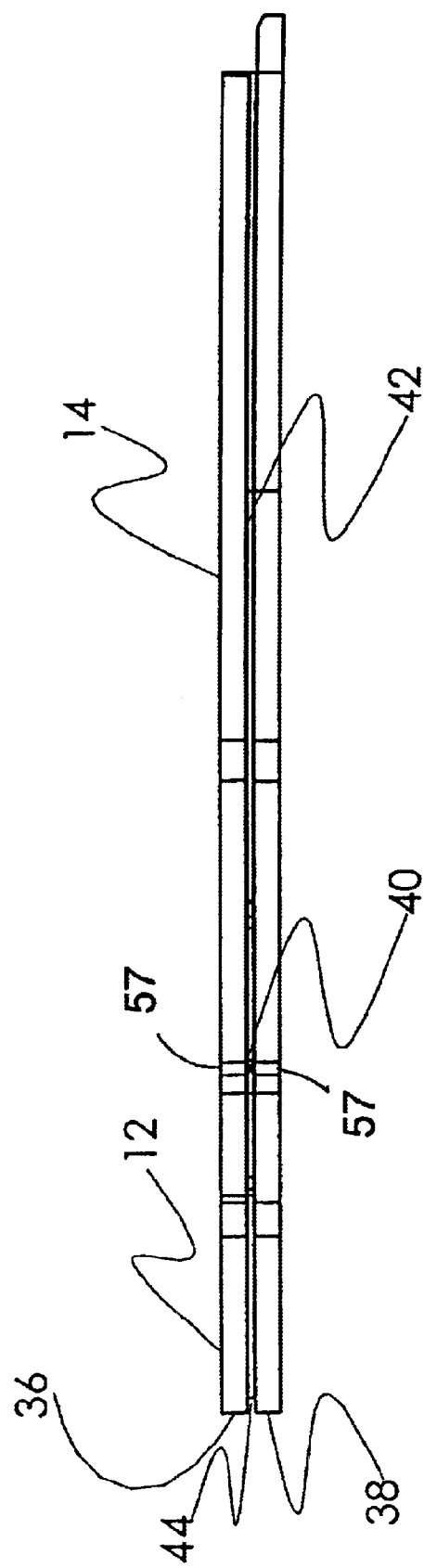
FIG. 3 is a side view of the assembly shown in FIG. 2.
Figure 4:
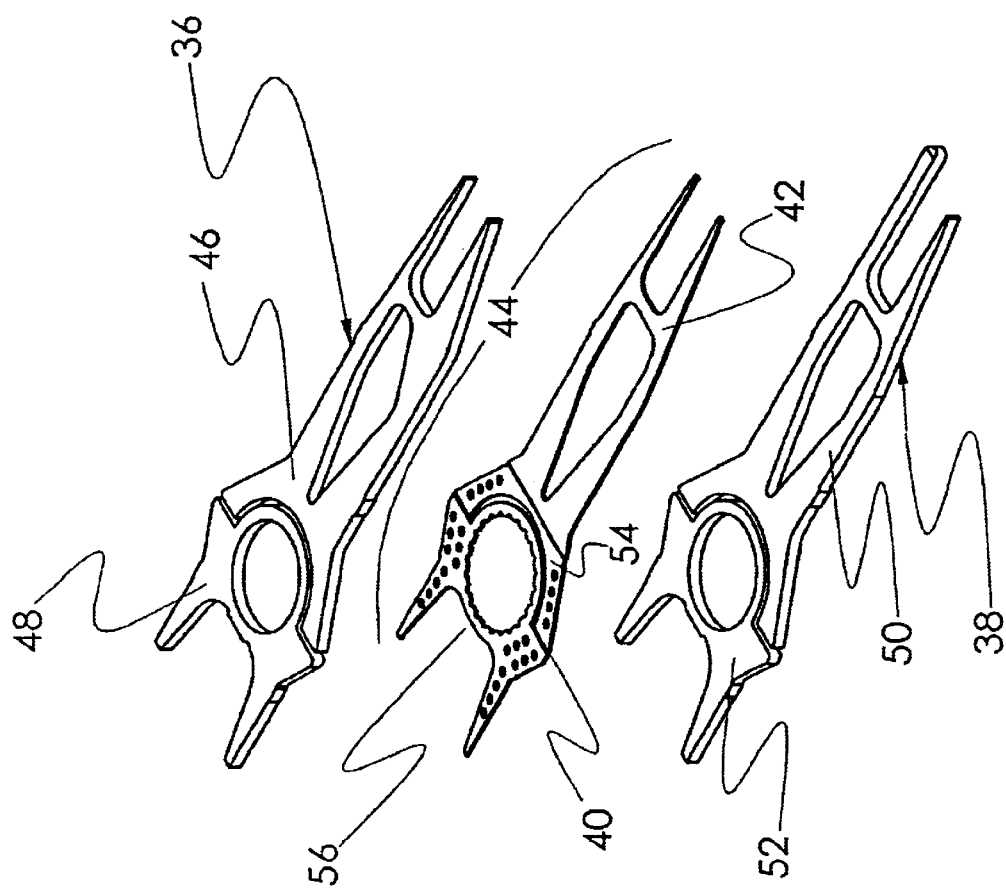
FIG. 4 is an exploded view of the actuator assembly shown in FIG. 2.

FIGS. 2–4 provide additional views of the actuator arm 10, with the optical pickup unit, voice coil motor assemblies and bearing cartridge removed. The forward and rearward portions 12, 14 of the actuator arm 10 of the preferred embodiment are each comprised of an upper planar element 36 and a lower planar element 38 with a flexure member 40 and spacer member 42, comprising a third planar element 44, disposed between the upper and lower planar elements. In the preferred embodiment, as partially illustrated in FIG. 5, both the upper and lower planar elements 36, 38 comprise eight separate layers or plies of carbon fiber material $L_1$–$L_8$ made from composite planar element panels 58, although the number of layers or plies comprising the overall laminate structures which are the planar elements 36, 38 may be more or less, provided symmetry about the neutral axis of the planar element is generally maintained. In particular, each carbon fiber layer $L_1$–$L_8$ of the planar elements 36, 38 has a distinct geometry and purpose such that the resulting carbon fiber planar element can take advantage of the separate benefits of the individual layers. In this regard, the fibers within each layer are oriented to optimize the purpose of the layer and each layer can form a uniaxial fiber matrix. For example, fibers are oriented parallel to the orientation of beam elements to provide desired stiffness and the fibers of different layers cross at high enough angles with respect to the other individual layers to provide an overall laminate structure which is stiff in some directions and flexible in others. Generally, the fibers are parallel to each other within each carbon fiber layer $L_1$–$L_8$, but the orientation of the fibers from layer to layer in an overall planar element of the actuator assembly may vary.

Figure 6:
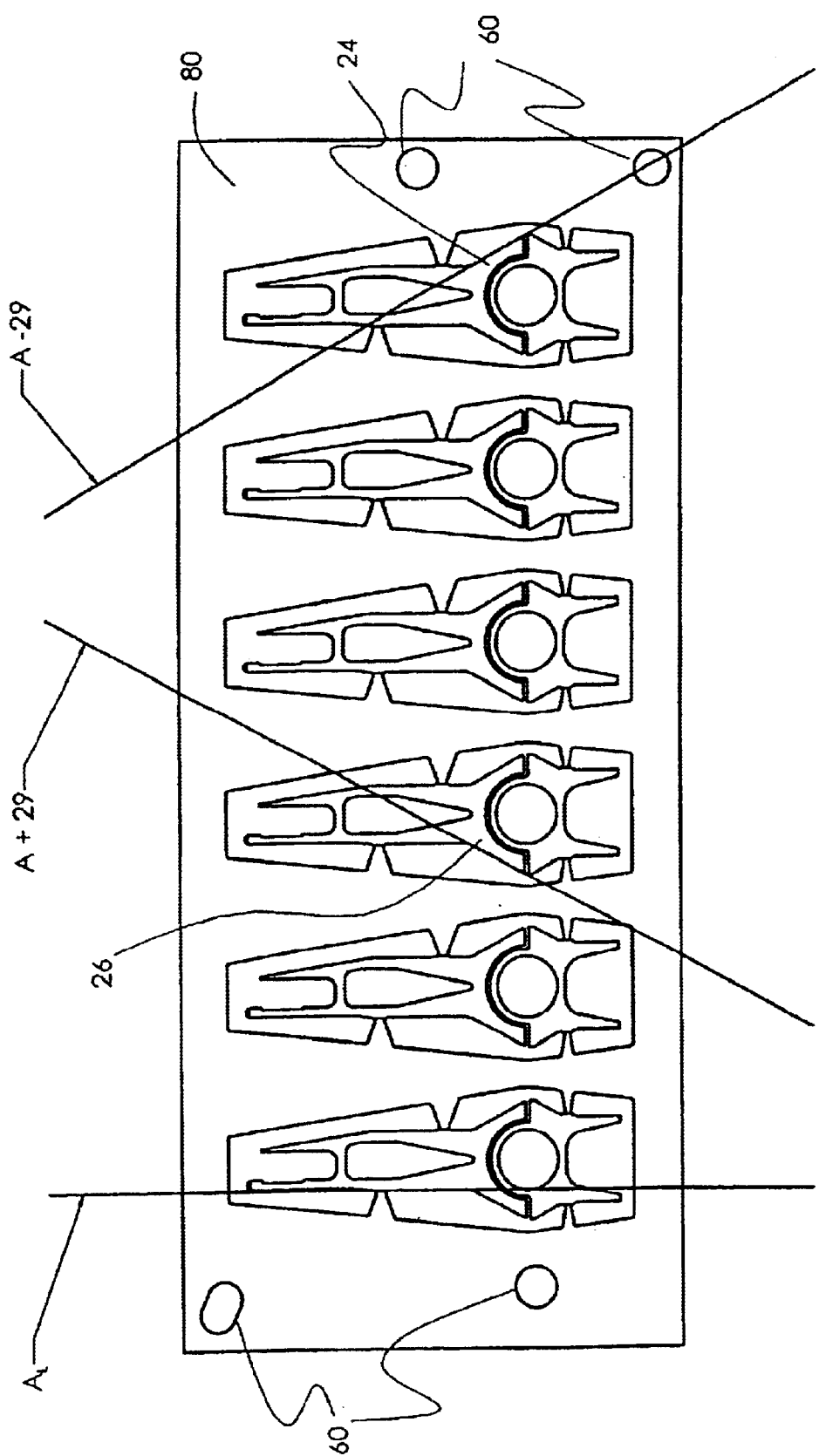
FIG. 6 is a top plan view of an array of lower composite planar elements, further showing the various axes of orientation of the fibers within the layers comprising the upper and lower composite planar elements.
Figure 7:
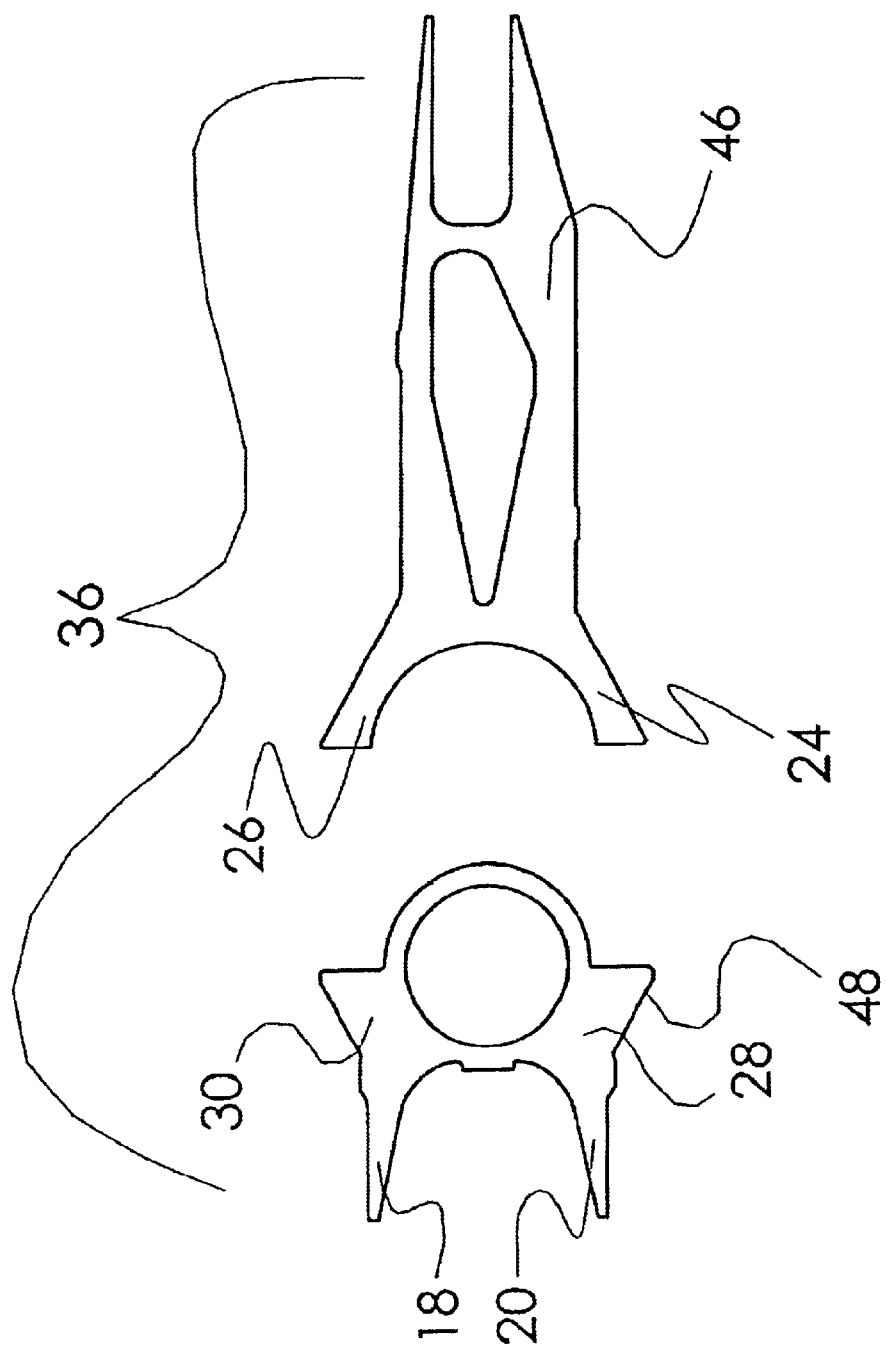
FIG. 7 is a separate top plan view of the forward and rearward portions of the upper composite planar element of the actuator assembly shown in FIG. 2.
Figure 8:
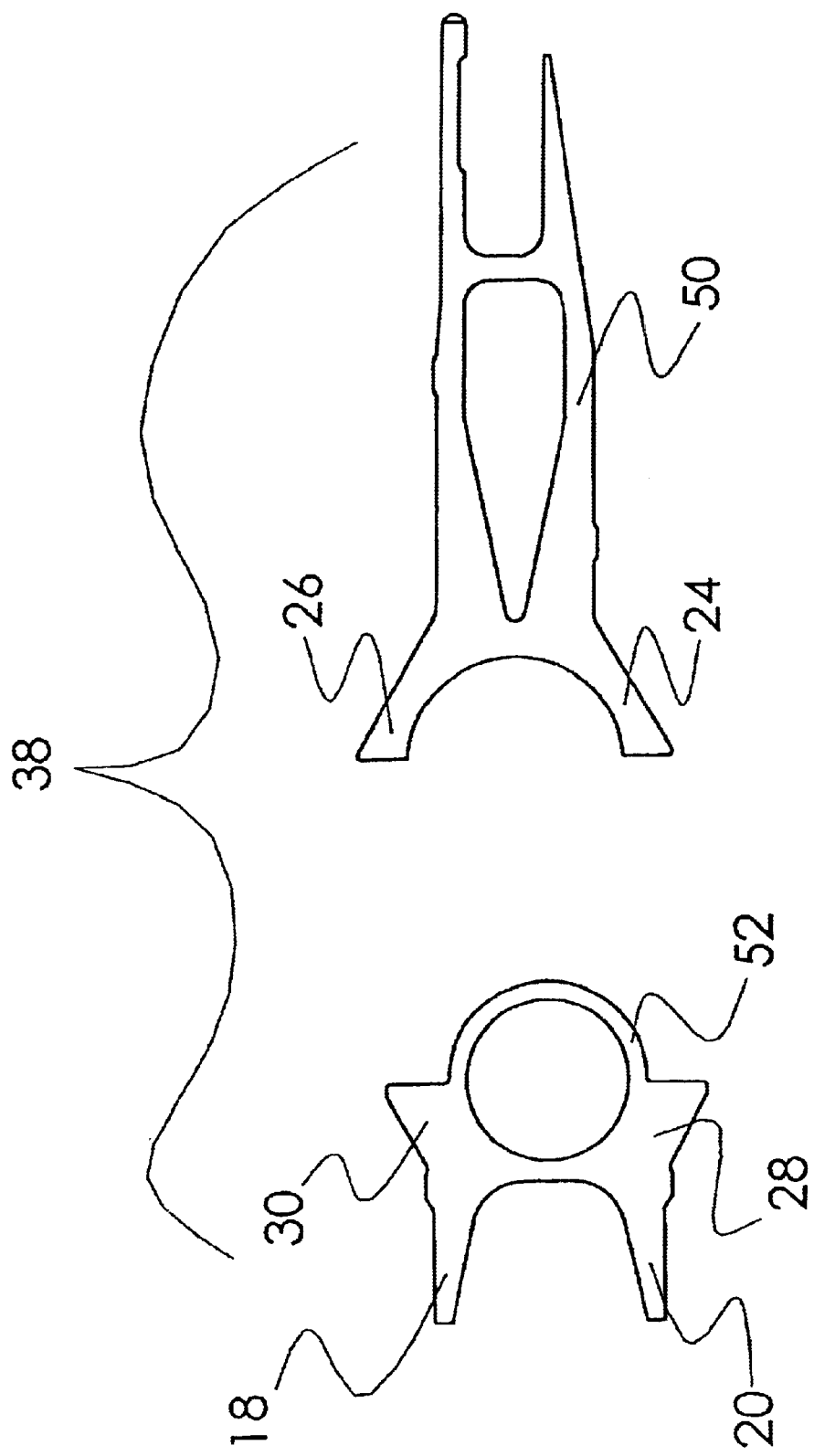
FIG. 8 is a separate top plan view of the forward and rearward portions of the lower composite planar element of the actuator assembly shown in FIG. 2.

In the planar elements having eight carbon fiber layers, the fibers in each layer are approximately 0.002 inches in diameter. In addition, in four of the eight layers $L_1$, $L_2$, $L_7$, $L_8$, the fibers have a zero degree orientation, meaning the fibers are aligned parallel to the longitudinal axis $A_L$ of the actuator arm 10 as shown in FIG. 6. Two of these zero degree oriented layers $L_1$, $L_2$, are the upper most layers and two of the zero degree oriented layers $L_7$, $L_8$, are the lower most layers of the planar elements 36, 38. The fibers in the center four layers $L_3$–$L_6$, are oriented alternately at plus or minus 29 degrees relative to the longitudinal axis $A_L$. This orientation is shown in FIG. 6 at $A_{+29}$ and $A_{-29}$. Twenty-nine degree fiber orientation is selected because it is the orientation of arm segments 24 and 26 relative to the long axis of the actuator arm. By orienting the fibers of these layers $L_3$–$L_6$ to be parallel to the orientation of arm segments 24, 26, these arm segments or beam elements are stiffened with respect to bending. The layers $L_1$–$L_8$ are arranged symmetrically by their fiber orientation to avoid curling of the composite planar element panels 58 and planar elements 36, 38. The varying fiber orientation of the layers also gives greater strength to the overall structure and helps reduce or eliminate damage to the planar elements 36, 38 during handling and assembly. Also, it is desirable to carefully control the quantity of resin within each fiber layer $L_1$–$L_8$. By matching the thickness of the individual layers $L_1$–$L_8$ as close as possible to the diameter of the fibers, the strength of the laminated layers, and thus the fiber planar element, increases.

Carbon is the preferred fiber because it has among the highest ratios of stiffness to density. For example, the specific gravity of a carbon fiber planar element is approximately 1.8, very near that of magnesium, but will have a Young's modulus of approximately 50 million pounds per square inch, whereas magnesium has a Young's modulus of approximately 7 million pounds per square inch. By way of comparison, steel has a Young's modulus of 30 million pounds per square inch, but a specific gravity of 7.8. Thus, a carbon fiber planar element is approximately four times less dense than steel, but is sixty-seven percent stiffer.

Each planar element 36, 38 is comprised of a forward portion and a rear portion to allow the focus arm 14 of the actuator assembly 10 to pivot relative to the disk surface. Thus, with reference to FIGS. 4 and 7–9, the upper planar element 36 includes a front portion 46 and a rear portion 48 and the lower planar element 38 includes a front portion 50 and a rear portion 52.

Figure 9:
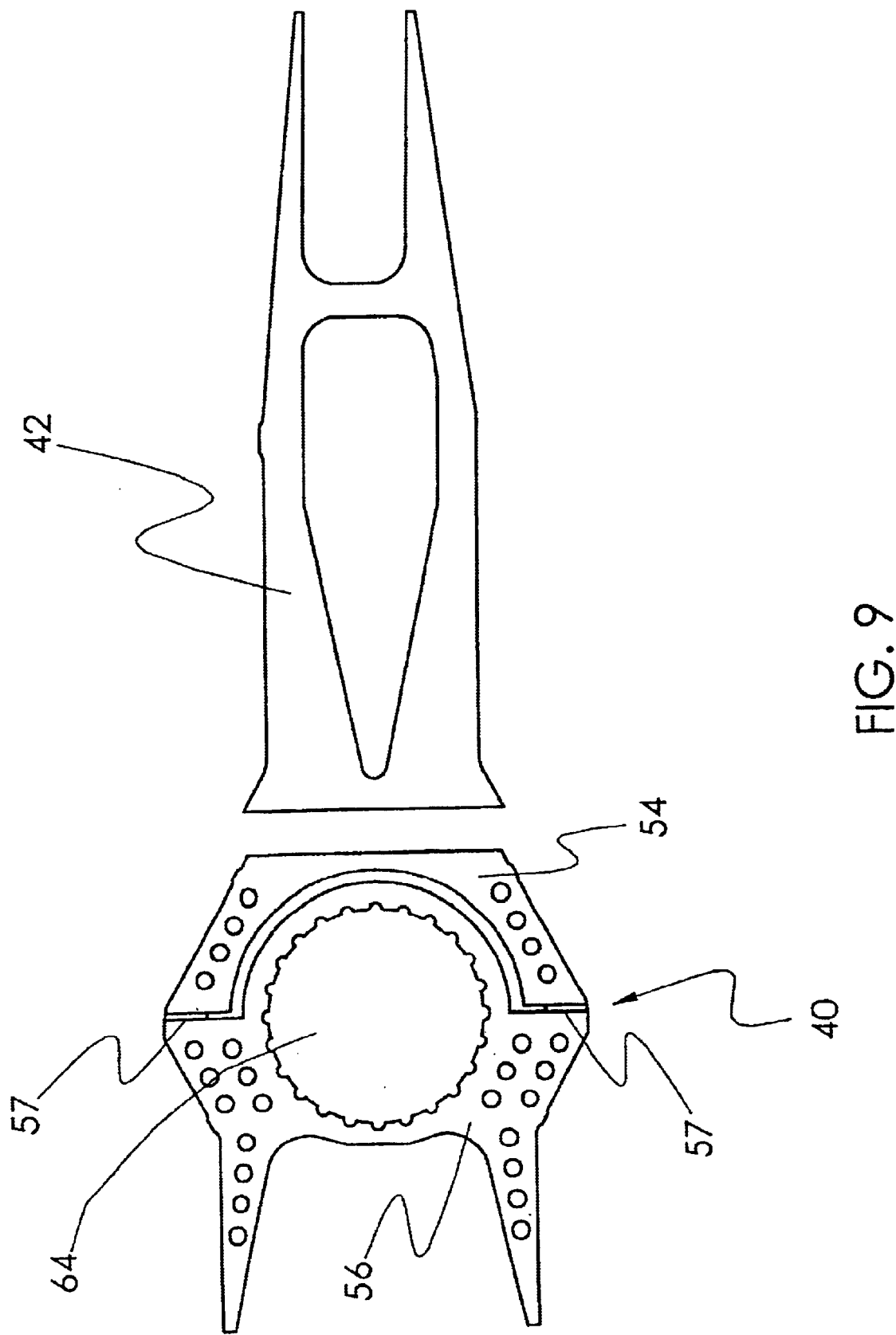
FIG. 9 is a top plan view of the flexure and spacer of the actuator assembly shown in FIG. 2.
Figure 12:
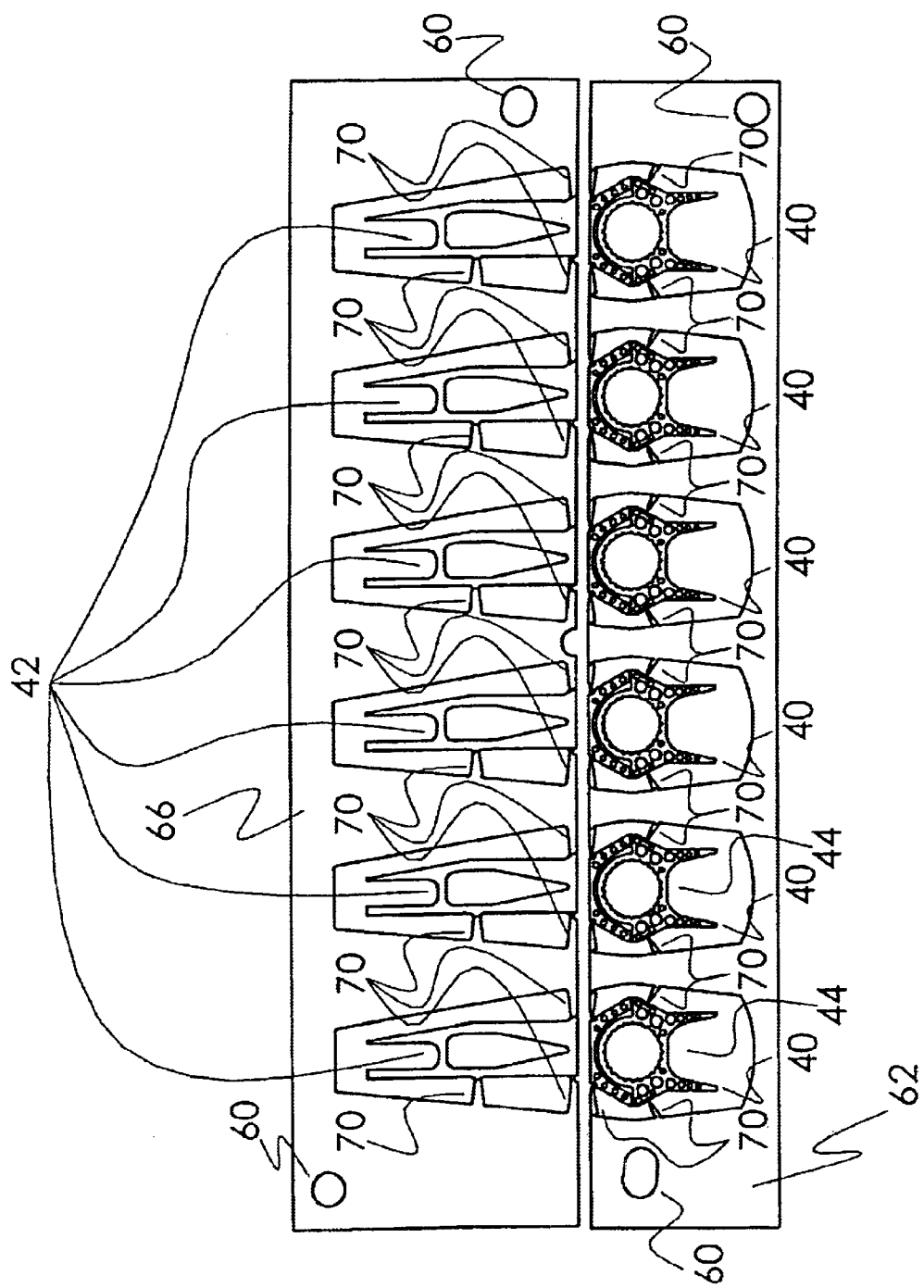
FIG. 12 is a top plan view of an array of flexure and spacer members of the actuator assembly shown in FIG. 2.

FIG. 9 illustrates an individual flexure member 40 and spacer 42 and FIG. 12 illustrates an array of flexure members 40 and spacers 42 in panel forms 62 and 66 respectively. Preferably, the material used to make the flexures 40 is a flexible metal such as Sandvick 11R51, which is a 301 series stainless steel having a yield strength of approximately 283,000 psi. However, it should be appreciated that the flexures 40 can be made from any appropriate flexible material that can withstand repeated bending as the focus arm 14 is adjusted to maintain focus on the data layer within the disk. Alternatively, the spacer 42 may be made from fiber composite material like the upper and lower planar elements 36, 38. In addition, the footprint of the spacer 42 may closely match that of the forward portions 46, 50 of the upper and lower planar elements 36, 38, respectively, or it may be smaller and have a profile different from the forward portions of the planar elements to reduce weight or provide different stiffness characteristics to the actuator assembly.

The flexure member 40, as shown in FIG. 9, includes a front portion 54 and a rear portion 56 which generally match the contour of the adjacent areas of the front and rear portions of the upper and lower planar elements 36, 38. The rear portion 56 of the flexure member 40 includes an aperture 64 to receive a bearing cartridge 22. Importantly, a pair of narrow bridges 57 or flexure portion of flexure member 40 connect the front portion 54 and the rear portion 56 and allow the front portion 54 to pivot relative to the rear portion 56. In turn, because the front portion 14 and rear portion 12 of the upper and lower planar elements 36, 38 do not overlap the flexure portion 57 as seen in FIGS. 2 and 3, the front portion 14 may also pivot relative to the rear portion 12. The flexure portion or narrow bridge 57 avoids any glue seepage from the adjacently abutting upper and lower planar elements 36, 38 from altering the frequency of the flexure. As a result, the desired response of the bending of the actuator arm is controlled. Absent this flexure portion/narrow bridge 57 being present, glue seepage into the area could alter the bending characteristics of flexure 40. Altering the shape is more easily accomplished than controlling glue seepage. The array of flexure members in panel 62, as shown in FIG. 12, is preferably made by a die cutting and coining process, but could be made by etching or any other process known to persons of skill in the art.

Figure 5:
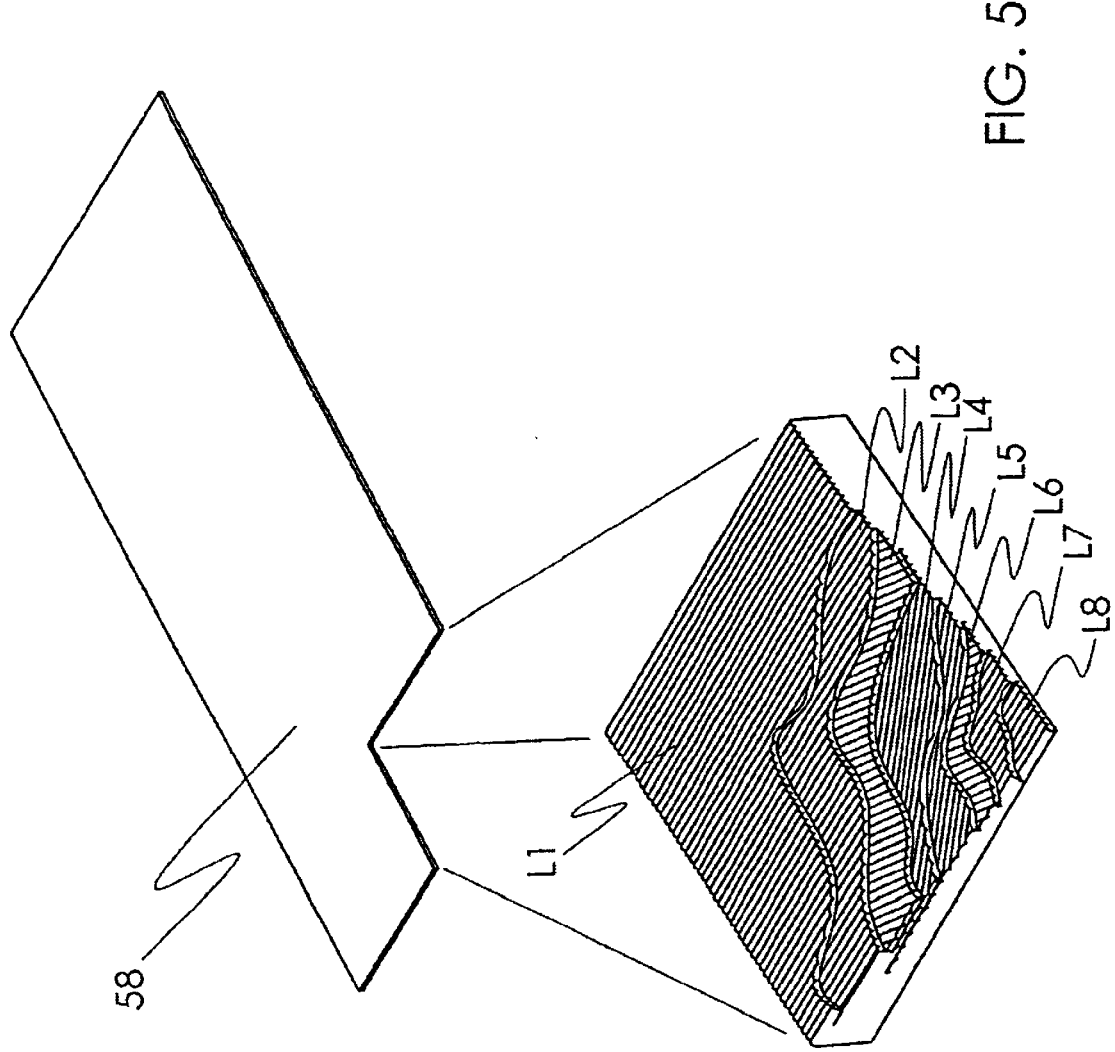
FIG. 5 is a partial cut away perspective view of the layers of an upper and lower composite planar element and a composite planar element panel of the present invention, showing the orientation of the fibers in each layer.
Figure 10:
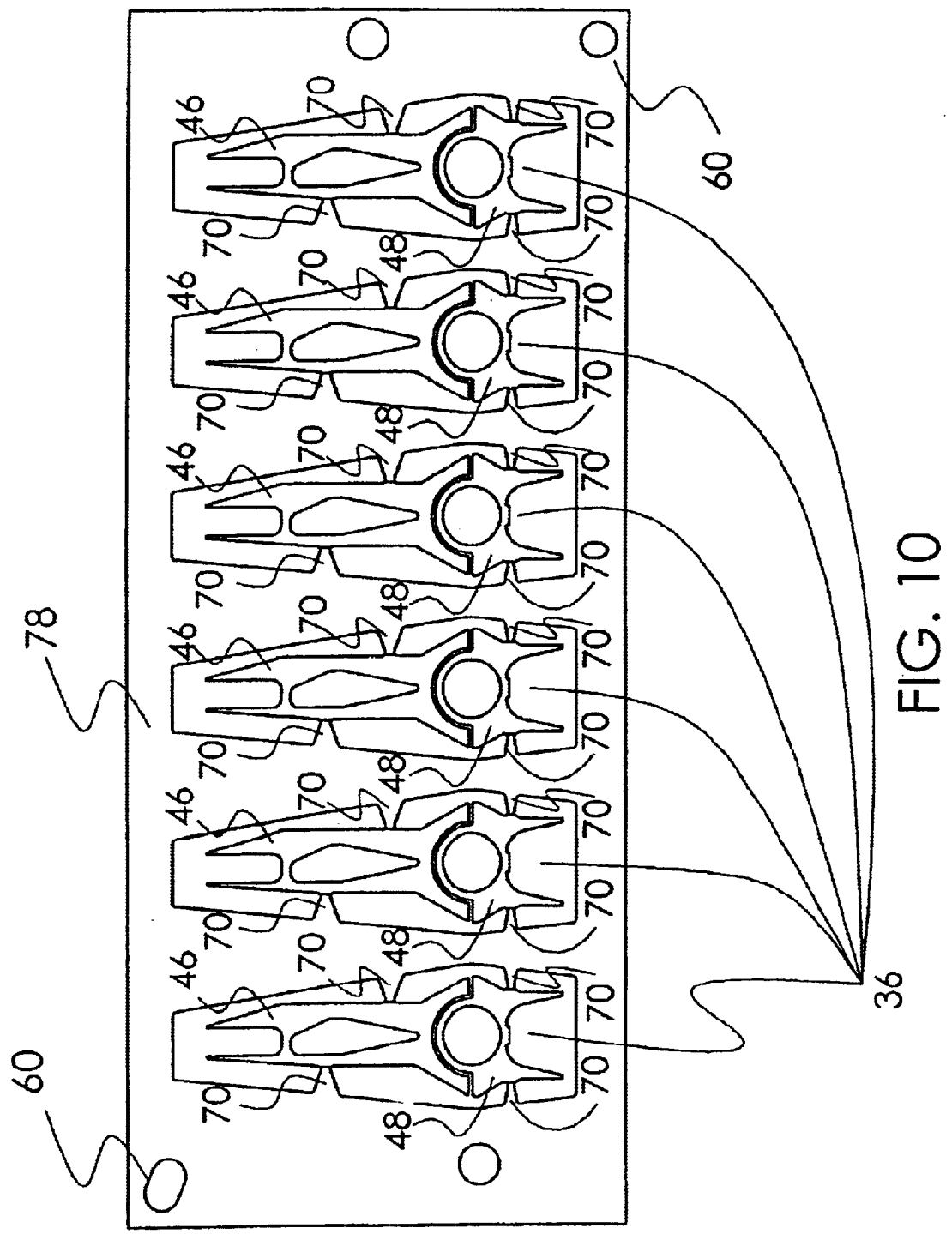
FIG. 10 is a top plan view of an array of upper composite planar elements of the actuator assembly shown in FIG. 2.
Figure 11:
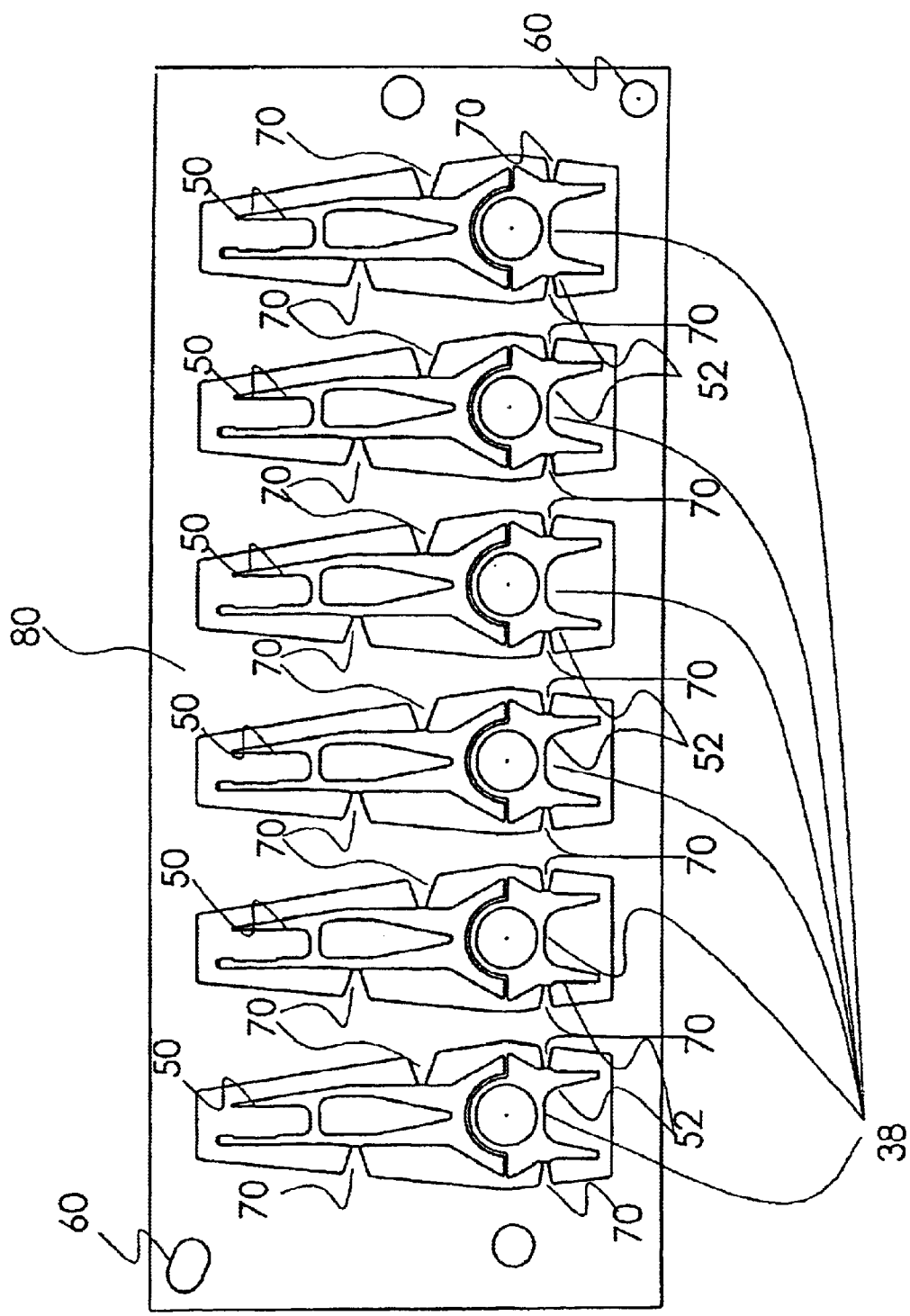
FIG. 11 is a top plan view of an array of lower composite planar elements of the actuator assembly shown in FIG. 2.

For purposes of manufacture, eight layers or plies of carbon fiber material $L_1$–$L_8$, with the fibers preferably substantially oriented at a predetermined angle (see FIGS. 5, 6), are joined together to form a single carbon fiber laminate or panel 58, as shown in FIG. 5. Arrays of upper and lower planar elements 36, 38 are cut into the laminated panel 58 to form cut panels 78 and 80 (see FIGS. 10, 11). The number of individual component pieces to be cut in an array may vary. The embodiment shown in the drawings have six upper or lower planar elements 36, 38 per array. Ideally, a computer or numerically controlled water jet is used to cut the component footprints in each panel 58. Alternatively, similarly controlled milling machines can cut the array of component pieces from the panel 58. A water jet, however, is not only faster, but is much more cost effective than milling machines. Where a milling machine utilizes a cutting tool that wears out and needs regular replacement, a water jet has no such problem. Moreover, a water jet can cut multiple panels 58, creating multiple copies of cut panels 78 and 80 at one time, thereby further increasing output. FIGS. 10 and 11 illustrate arrays of six upper and lower planar elements 36, 38 cut into two panels 58 of eight laminated carbon fiber layers, respectively. At the same time as the water jet, or other methods known and available to those skilled in the art cut the arrays of upper and lower planar elements 36, 38, registration members, such as holes 60, are also cut in the panels 58. The purpose for cutting the registration holes 60 at the same time as the component structural pieces are cut is to reduce subsequent errors in alignment when assembling and bonding the multiple planar elements into an actuator arm. In this manner, the only error is that which would result due to the CNC cutting process, but not to the alignment of the planar elements when combined. Alternatively, the individual layers $L_1$–$L_8$ may be separately cut to form arrays of component pieces and then laminated to form panels 78, 80 of planar elements 36, 38 or uncommon cuts in each layer $L_1$–$L_8$ can be made individually and all common cuts can be made following lamination of the multiple layers into a single planar element. The process of forming registration features in each layer would be the same in order to enhance accurate alignment of the individual layers $L_1$–$L_8$.

In general terms, a method of assembling the actuator of the present invention will now be described. As illustrated in FIGS. 5 and 6, depicting a first embodiment, eight carbon fiber layers $L_1$–$L_8$ are combined to form the upper and lower panels 58, which are then cut to create cut panels 78, 80, from which fiber planar elements 36, 38 will result. Each layer $L_1$–$L_8$ is impregnated with epoxy for bonding the individual layers together. The combined structure is placed in an autoclave under appropriate pressures and temperatures to activate the epoxy and secure the layers $L_1$–$L_8$ into a laminate panel 58. In connection with the preferred embodiment, the temperature is approximately 325° F. and the applied pressure is approximately 50 pounds per square inch.

Following the autoclave procedure, the laminated panels 58, are cut, by means of water jet or other appropriate techniques, into an array of upper and lower carbon fiber planar elements 36, 38 of the actuator arm 10 in panels 78 and 80. Alternatively, the cutting of component pieces within the individual layers $L_1$–$L_8$ may be done prior to bonding the layers together or some of the cut may be made in individual layers and the remaining cuts are made in the overall laminated panel. At this point, registration features 60 are also accurately located and cut into the panels 78, 80. Similarly, an array of flexures 40 are cut from metallic or other appropriately flexible material into a panel 62 which will mate with a pair of upper and lower fiber planar panels 78, 80. Also, an array of spacers 42 are cut from appropriate material into a panel 66, which will also mate with the pair of upper and lower fiber planar panels 78, 80. The flexure and spacer panels 62, 66 also have aligned registration features, such as apertures 60, to match those in the carbon composite planar panels 78, 80. In the cutting process, a number of sprues 70 are left between the planar elements 36, 38 and the surrounding panels 78, 80, as well as between the flexures 40 and spacers 42 and the remaining panels 62 and 66 respectively. The registration holes 60 maintain alignment among the panels 62, 66, 78 and 80 during further processing. It should be appreciated that other methods of providing registration among the various panels can be used instead. For example, alignment may be achieved by using panel edges or corners, or by optically detecting identified fiduciaries on the panel or by bearing bores.

Figure 13:
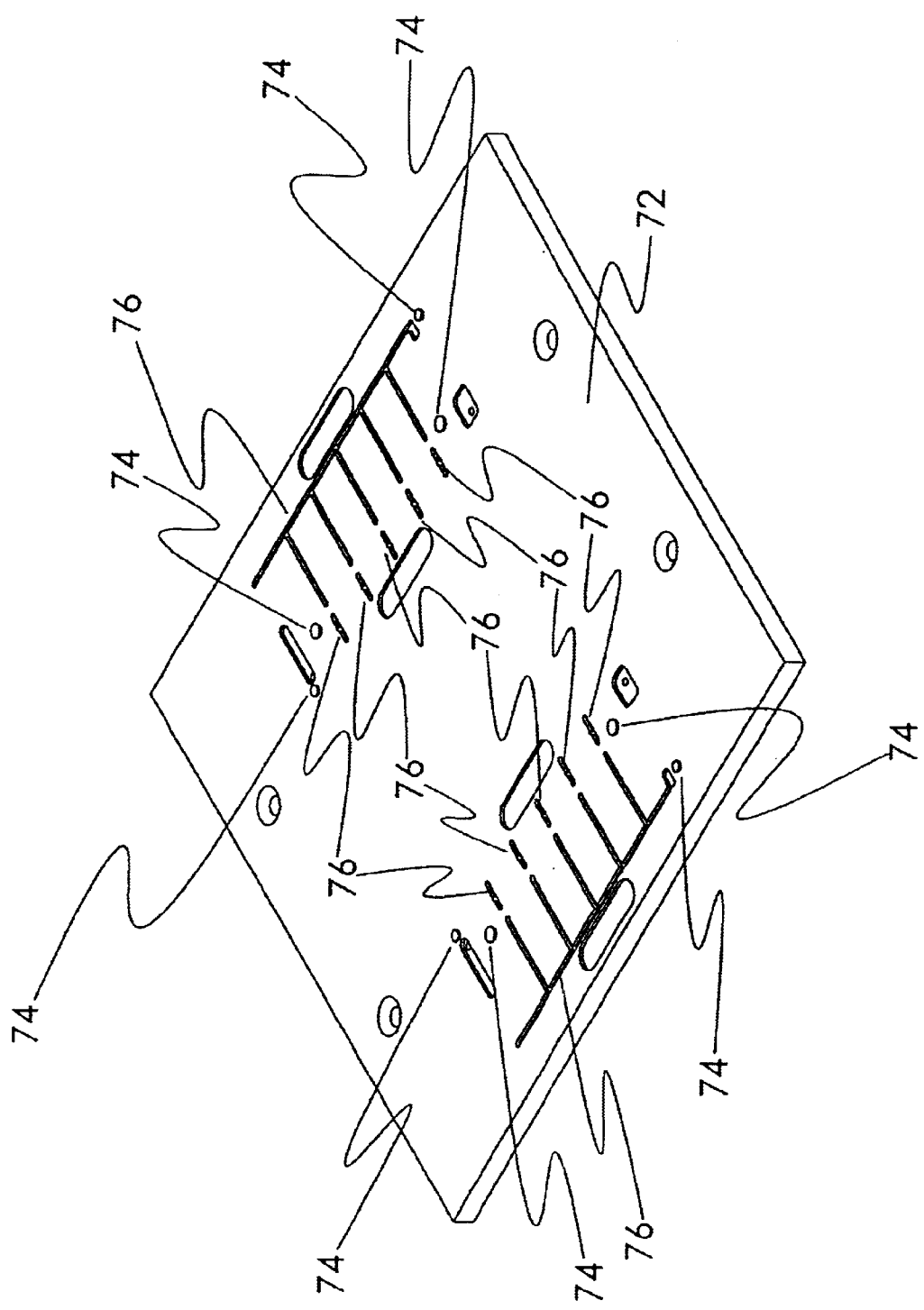
FIG. 13 is an elevated perspective view of a vacuum chuck assembly used in assembling an actuator assembly of the present invention.
Figure 14:
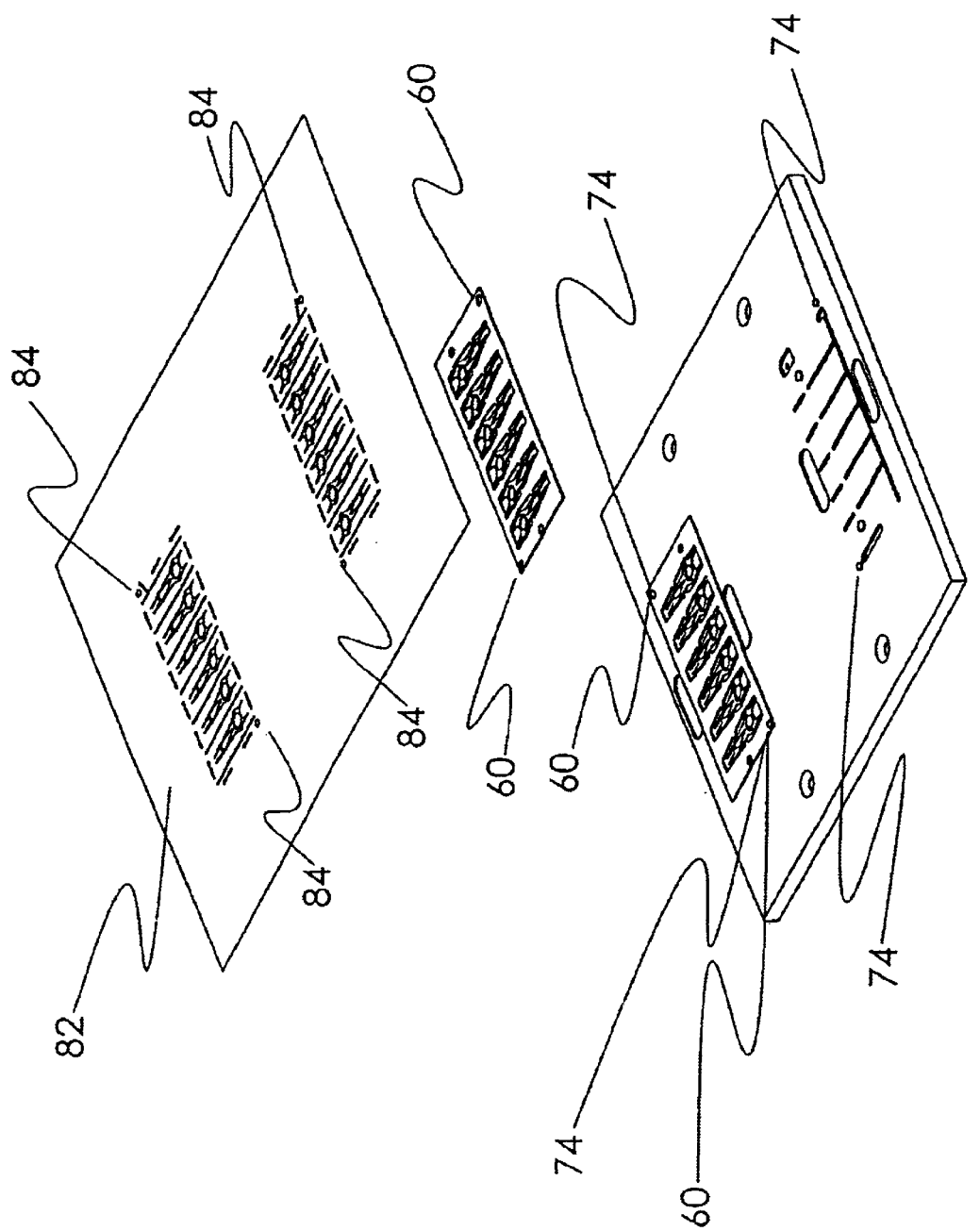
FIG. 14 is a partially exploded view of a vacuum chuck assembly, an array of upper composite planar elements and a silk screen adhesive pattern used in assembling an actuator assembly of the present invention.

At this point, the panels 62, 66, 78 and 80 are ready to be combined into an actuator arm assembly. The upper and lower carbon fiber panels 78, 80 containing planar elements 36, 38, are placed on a clamping fixture, such as vacuum chuck 72 (FIG. 13). The registration pins 74 on the chuck 72 mate with the registration holes 60 in the panels 78, 80 and properly co-align the panels. Vacuum pressure through slots 76 hold an upper and lower planar element panels 78, 80 in position for application of adhesive. Silk screen techniques are then used to apply adhesive to both the upper and lower fiber planar element panels 78, 80. FIG. 14 illustrates a chuck 72 with a lower panel 80 of planar elements 38 positioned on registration pins 74 and an upper panel 78 of planar elements 36, also intended to be positioned on chuck 72 but elevated from the surface of the chuck 74 for illustration. A silkscreen 82, showing the openings for the pattern of adhesive to be applied, is also shown. The silkscreen also includes registration holes 84 for aligning the silkscreen 82 relative to the panels 78, 80. It should be appreciated however, that other techniques may be utilized to apply adhesive, including but not limited to application by roller, spray, other printing or as a film.

Figure 15:
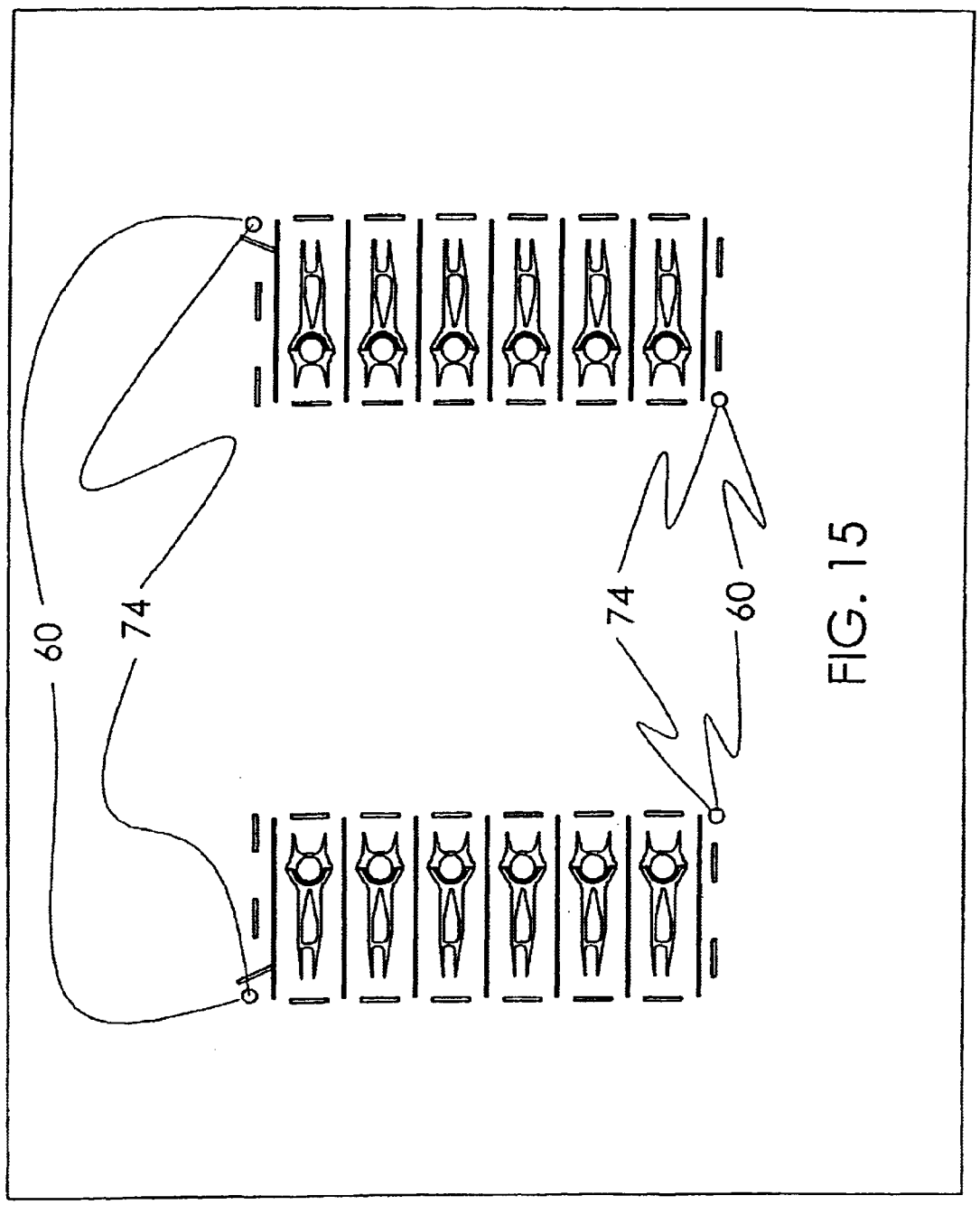
FIG. 15 is a top plan view of the glue pattern for a complementary pair of upper and lower composite planar elements.

To simplify the glue application process, in the preferred embodiment, a single thickness of glue or adhesive is applied across the entire length of the upper and lower panels 78, 80 in one application. Care must be taken to accurately place the adhesive away from edges of the upper and lower planar elements 36, 38 to avoid adhesive being squeezed out along any edges. Yet, it is also necessary to have sufficient adhesive to fill all voids between the upper and lower fiber planar elements, taking into account the existence of the flexure and spacer. The glue pattern applied to upper and lower planar panels 78, 80 is created by silkscreen 82, as shown in FIGS. 14 and 15. The preferred adhesive is a 3M 2214 metal-filled, single-part epoxy. Because this epoxy cures at approximately 120° C. or higher, the glue can be applied to the upper and lower planar panels 78, 80 using the silkscreen 82 pattern and stored in a cool location without concern that the glue will cure. This allows an inventory of arrays of combined planar elements 36 and 38, with adhesive already applied, to be made in advance and be available for final assembly as demand requires. Alternatively, if the flexure 40 and spacer 42 do not match the shape of the planar elements 36, 38, a different thickness of glue may be applied at locations where the flexure and spacer are absent. In this regard, the glue may be applied in stripes, analogous to half-tone printing processes, rather than in a solid, continuous pattern.

Figure 16:
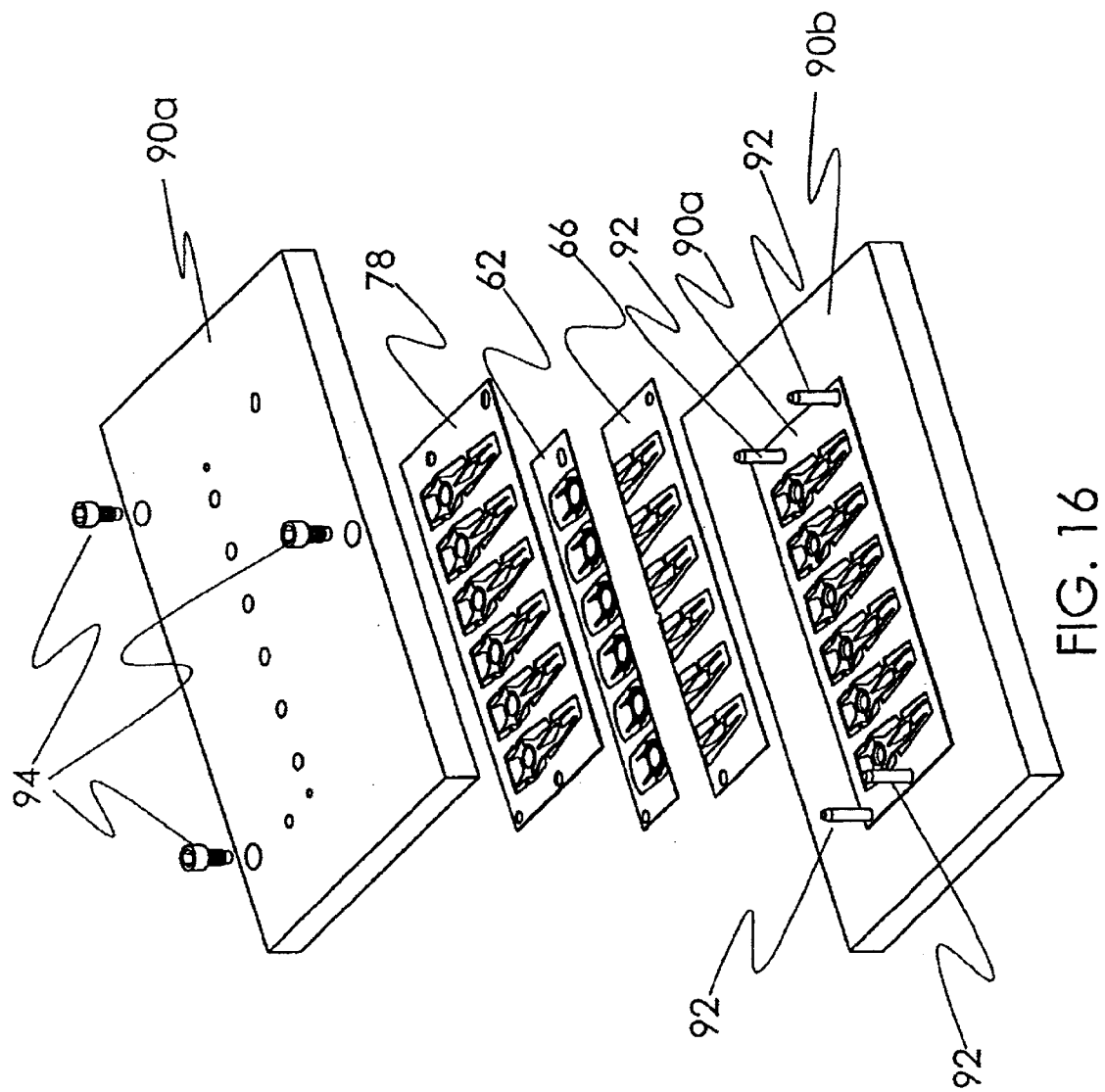
FIG. 16 is an exploded view of the lower bonding plate, composite planar elements, flexure panel, spacer panel and upper bonding plate, showing the depth stops.

As completed actuators 10 are needed, the planar panels 78, 80, with adhesive-applied as shown in FIGS. 14 and 15, flexure panels 62 and spacer panels 66 can be positioned within bonding plates 90a and 90b as shown in FIG. 16 using the registration holes 60 and registration pins 92. The upper bonding plate 90a is then placed over the combination and secured to the lower bonding plate 90b under appropriate pressure and temperature conditions. As shown in FIGS. 17 and 18, the bonding plates include adjustable limit stops 94, which establish the spacing between the upper and lower plates, thereby establishing the thickness of the actuator assembly. The bonding plates 90 containing the panels 78, 80, 66 and 62 are placed in an oven for bonding the component pieces into a final laminated structure. Presently, using the 3M epoxy, this process takes approximately two hours in an oven at 150° C. It should be understood that the process parameters can vary, particularly depending upon the epoxy used.

Once cured, the completed lamination can be removed from the bonding plates, while the individual component pieces remain attached to the surrounding structure due to the sprues 70. This allows for ease of handling without damage to the miniature laminated structures. It further allows the other component pieces, such as the optical pickup unit, flex circuit, voice coil motors and bearing cartridge, to be assembled to the actuator structure with simplicity.

While various embodiments have been shown and described, it will be apparent that other modifications, alterations and variations may be made by or will occur to those skilled in the art to which this invention pertains, particularly upon consideration of the foregoing teachings. For example, the number of layers or plies within the fiber planar elements may vary as may the relative orientation of the fibers within each layer. In addition, while carbon fiber composite material performs well in this application, other materials such as glass, magnesium, boron, beryllium, Kevlar and ceramics, alone or in various combinations may also perform satisfactorily. It is also contemplated that the component shapes may be cut from individual layers of material, which layers are subsequently laminated to form a composite panel, or that the component shapes are cut from the composite panel. It is still further contemplated that the individual layers comprising a planar element may have varying shapes and sized relative to each other. The objective is to achieve a lightweight, but a strong and stiff actuator assembly. It is therefore contemplated that the present invention is not limited to the embodiments shown or described in such modifications and other embodiments as incorporate those features which constitute the essential functions of the invention are considered equivalent and within the true spirit and scope of the present invention.

What is claimed is:

1. A method for making an actuator assembly, comprising:

forming a first planar member, and a second planar member, wherein each planar member comprises composite fiber material and includes a front portion and rear portion;

forming a planar flexure member having a front portion and a rear portion connected by a flexure region; and adhering the first planar member to a first surface of the planar flexure member and the second planar member to an opposing second surface of the planar flexure member such that the first and rear portions of the first and second planar members do not overlap the flexure region, whereby each front portion may pivot relative to each rear portion through flexure of the flexure region.

2. The method of claim 1, wherein the first planar member is formed from a first sheet of the composite fiber material, and wherein the second planar member is formed from a second sheet of the composite fiber material, and wherein the planar flexure member is formed from a third sheet of flexible material, the method further comprising: forming registration means in the first and second sheets of composite material and in the third sheet of the flexible material.

3. The method of claim 2, wherein the first and second sheet of composite material each comprises a plurality of layers of composite fiber material.

4. The method of claim 3, wherein said plurality of layers of composite fiber material is eight.

5. The method of claim 3, wherein the steps of forming the planar members each further comprises orienting the fibers within each layer to optimize the strength and stiffness of the planar members.

6. The method of claim 2, wherein the step of adhering the first planar member to the first surface of the planar flexure member and the second planar member to the opposing second surface of the planar flexure member further comprises aligning the registration means in each of the first, second, and third sheets.

7. The method of claim 1, further comprising applying adhesive to the planar members using silkscreen techniques.

8. The method of claim 1, wherein the forming the flexure region step comprises forming two narrow bridges connecting the front and rear portions of the planar flexure member.

9. The method of claim 1, wherein the composite fiber material includes carbon fiber.

10. The method of claim 9, wherein the carbon fibers have a diameter of approximately 0.002 inches.

11. The method of claim 1, wherein the fibers in said composite fiber material are selected from one or more of the following materials: glass, magnesium, boron, beryllium, Kevlar or ceramic.

12. The method of claim 1, wherein said forming is cutting.

13. The method of claim 12, wherein said cutting is performed by a water jet.

* * * * *